United States Patent
Ito et al.

(10) Patent No.: US 7,735,877 B2
(45) Date of Patent: Jun. 15, 2010

(54) CONNECTION STRUCTURE FOR RESIN PIPE

(75) Inventors: Seiji Ito, Nabari (JP); Jun Okada, Toyota (JP)

(73) Assignees: FTS Co., Ltd., Aichi-ken (JP); Nitta Moore Company, Osaka (JP)

( * ) Notice: Subject to any disclaimer, the term of this patent is extended or adjusted under 35 U.S.C. 154(b) by 86 days.

(21) Appl. No.: 11/575,903

(22) PCT Filed: Sep. 21, 2005

(86) PCT No.: PCT/JP2005/017387

§ 371 (c)(1),
(2), (4) Date: Apr. 24, 2007

(87) PCT Pub. No.: WO2006/033354

PCT Pub. Date: Mar. 30, 2006

(65) Prior Publication Data

US 2008/0001399 A1    Jan. 3, 2008

(30) Foreign Application Priority Data

Sep. 24, 2004    (JP) .............................. 2004-276297

(51) Int. Cl.
*F16L 33/00* (2006.01)
(52) U.S. Cl. ........................................ 285/239; 285/259
(58) Field of Classification Search ................ 285/239, 285/242, 241, 259
See application file for complete search history.

(56) References Cited

U.S. PATENT DOCUMENTS

| | | | | |
|---|---|---|---|---|
| 3,759,554 A | * | 9/1973 | Carter | 285/260 |
| 4,603,890 A | * | 8/1986 | Huppee | 285/239 |
| 4,733,890 A | * | 3/1988 | Vyse | 285/148.14 |
| 5,261,709 A | * | 11/1993 | McNaughton et al. | 285/319 |
| 5,779,286 A | * | 7/1998 | Kaishio | 285/379 |
| 5,879,033 A | * | 3/1999 | Hansel et al. | 285/239 |
| 5,921,592 A | * | 7/1999 | Donnelly | 285/340 |
| 5,957,163 A | * | 9/1999 | Ito et al. | 138/109 |
| 6,260,851 B1 | * | 7/2001 | Baron | 277/603 |
| 6,443,502 B1 | * | 9/2002 | Iida et al. | 285/351 |

(Continued)

FOREIGN PATENT DOCUMENTS

DE    3439522 A1    8/1985

(Continued)

*Primary Examiner*—David E Bochna
(74) *Attorney, Agent, or Firm*—Hahn & Voight PLLC; Roger C. Hahn

(57) ABSTRACT

A connection structure for a resin pipe, in which leakage of fluid from between a metal pipe and the resin pipe fitted on the metal pipe is prevented for a long time. In the connection structure, at least two diameter-expanded sections (10, 11) are formed with a spacing on an end region of a metal pipe (1), the spacing between the two diameter-expanded sections (10, 11) functioning as a circumferential groove (12) in which a seal ring (SR) is received, and a resin tube (2) is fitted up to a position beyond a far side diameter-expanded section (11) of the two diameter-expanded sections (10, 11). A back ring (BR) is received in the circumferential groove (12) together with the seal ring (SR). The diameter-expanded sections (10, 11) of the metal tube (1) are formed by bulging or spool shape-forming process.

11 Claims, 2 Drawing Sheets

U.S. PATENT DOCUMENTS 6,739,632 B1 * 5/2004 Thomas et al. ............... 285/339
7,150,478 B2 * 12/2006 Poirier et al. ............ 285/332.2

FOREIGN PATENT DOCUMENTS

| | | |
|---|---|---|
| EP | 0623404 A2 | 11/1994 |
| JP | 09 079462 | 3/1997 |
| JP | 09-126374 | 5/1997 |
| JP | 2002 228068 | 8/2002 |
| JP | 2004 011877 | 1/2004 |
| JP | 2004-308797 | 11/2004 |
| JP | 3964697 B2 | 8/2007 |

* cited by examiner

CONNECTION STRUCTURE FOR RESIN PIPE

TECHNICAL FIELD

The present invention relates to a connection structure for resin tubes.

BACKGROUND ART

Traditionally, a resin tube is connected with a metallic pipe which have a bulge or spool on its end made by a bulge-forming method or spool-forming method (these are methods to form a radially enlarged portion with nearly constant thickness on the pipe) by inserting the resin tube over the metallic pipe so as to be fitted together by pressure (For example, Patent Document 1).

In the above connected state where the resin tube is fitted by pressure onto the metallic pipe having a bulge or spool, the resin tube is enlarged in the diameter at a position where the radially enlarged portion is provided on the metallic pipe, and the diameter contraction action of the resin tube (restoration action of the resin tube trying to return to its original shape) develops a tightening strength to ensure a level of fluid tightness.

However, such a conventional connection structure for the resin tube has a drawback that the resin tube becomes declined in the tightening strength due to its thermal deterioration across the ages or the like and thereby the fluid tightness between the resin tube and the metallic pipe cannot be secured, hence a leakage of fluid may occur after a relatively shorter period of time.

Patent Document 1: Japanese Laid-open Patent Publication No. 9-126374 (See FIG. 5.)

DISCLOSURE OF THE INVENTION

It is an object of the present invention to provide a connection structure for resin tube which can prevent leakage of fluid between a metallic pipe and a resin tube throughout a considerable period of time when the resin tube is fitted by pressure onto the metallic pipe.

The connection structure for resin tube with a metallic pipe according to the present invention is characterized in that the metallic pipe has at least two radially enlarged portions at a tip area as spaced from each other, a seal ring is accommodated in a circumferential groove formed between the radially enlarged portions, and a resin tube is inserted by pressure over the metallic pipe until it passes beyond the inner radially enlarged portion of the two radially enlarged portions forming the circumferential groove.

Alternatively, a back ring may be accommodated together with the seal ring in the circumferential groove.

The radially enlarged portions of the metallic pipe may be formed by at least a bulge-forming method and spool-forming method.

The metallic pipe may also have another radially enlarged portion on an inner side of the radially enlarged portions forming the circumferential groove, acting as a stopper for an inserted tip of the resin tube by pressure.

The metallic pipe may also have another radially enlarged portion on an inner side of the radially enlarged portions forming the circumferential groove, for increasing physical strength which prevents the resin tube from coming off the metallic pipe.

The connection structure for resin tube according to the present invention can prevent leakage of fluid between a metallic pipe and a resin tube throughout a considerable period of time when the resin tube is fitted by pressure onto the metallic pipe.

DESCRIPTION OF REFERENCE NUMERALS AND SYMBOLS

Figure 1:
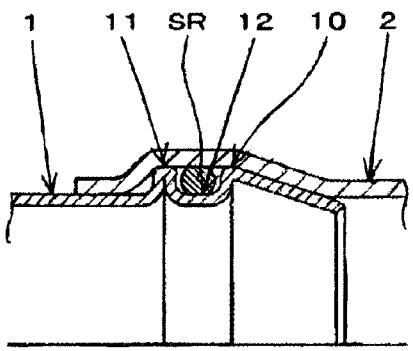
FIG. 1 is a semi-cross sectional view of a connection structure of a resin tube and a metallic pipe according to Embodiment 1 of the present invention.

SR seal ring
BR back ring
1 metallic pipe
2 resin tube
10 radially enlarged portion
11 radially enlarged portion
12 circumferential groove
13 radially enlarged portion
14 radially enlarged portion
15 radially enlarged portion

DETAILED DESCRIPTION OF THE INVENTION

Embodiments of the present invention in best modes for carrying out a connection structure for resin tube will be described in more detail below.

Embodiment 1

Figure 2:
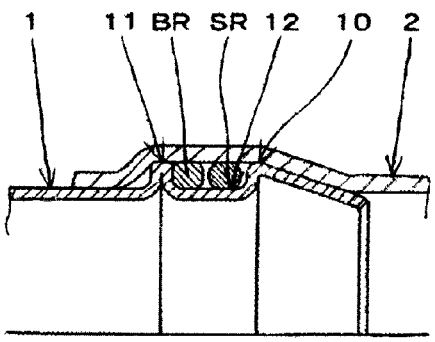
FIG. 2 is a cross sectional view showing a seal ring and a back ring fitted into a circumferential groove formed on the metallic pipe.

FIG. 1 is a semi-cross sectional view of a connection structure of a resin tube 2 and a metallic pipe 1 according to Embodiment 1 of the present invention, and FIG. 2 is a cross sectional view showing a seal ring SR and a back ring BR fitted into a circumferential groove 12 formed in the metallic pipe 1.

(Details of Metallic Pipe 1, Resin Tube 2, and Seal Ring SR for Forming this Connection Structure)

The metallic pipe 1 has two radially enlarged portions 10, 11 with a certain space between them near its tip (the enlarged portions are formed by a bulge-forming method or spool-forming method), as shown in FIG. 1, whereby a circumferential groove 12 is formed between the two radially enlarged portions 10, 11 in which a seal ring SR (mainly, an O ring) is accommodated. Alternatively, a back ring BR may be accommodated together with the seal ring SR in the circumferential groove 12, as shown in FIG. 2.

As shown in FIG. 1, the radially enlarged portion 10 is formed by a bulge-forming method so as to be gradually enlarged in the diameter from the tip side to the inner side and then sharply reduced in the diameter.

The radially enlarged portion 11 is formed by a spool-forming method so as to be sharply enlarged and then sharply reduced in the diameter, as shown in FIG. 1.

Both the radially enlarged portion 10, 11 are substantially equal in the outer diameters and a little smaller than the outer diameter of the seal ring SR.

The resin tube 2 has a single-layer or multi-layer construction formed of, for example, a nylon resin material or a fluorinated material, of which the inner diameter is determined so as to be gradually inserted by pressure over the metallic pipe 1 as radially enlarged. When the resin tube 2 is fitted by pressure onto the metallic pipe 1, a pressure force is developed between the metallic pipe 1 and the resin tube 2.

The seal ring SR is made of a fluorinated material or the like.

(Procedure for Connecting Resin Tube 2 to Metallic Pipe 1)

(1) The seal ring SR (and the back ring BR) are accommodated in the circumferential groove 12 between the two radially enlarged portions 10 and 11.

(2) As the resin tube 2 is inserted over from the tip of the metallic pipe 1 by pressure until the inserted tip of the resin tube 2 passes beyond the positions of the radially enlarged portions 10, 11, the resin tube 2 is forced to be enlarged in the diameter at the positions of the radially enlarged portions 10, 11. In this state, as described above, the metallic pipe 1 and the resin tube 2 remain pressed against each other and held in a fluid tightness state with the seal ring SR compressed by pressure between the metallic pipe 1 and the resin tube 2.

(Advantageous Function of the Connection Structure of Resin Tube 2 to Metallic Pipe 1)

The connection structure allows the resin tube 2 and the metallic pipe 1 to remain sealed in the fluid tightness state with the seal ring SR accommodated therebetween, even if the resin tube 2 is declined in the tightening strength due to its thermal deterioration across the ages, hence inhibiting leakage of fluid throughout a longer period of time.

Modification Similar to Embodiment 1

Figure 3:
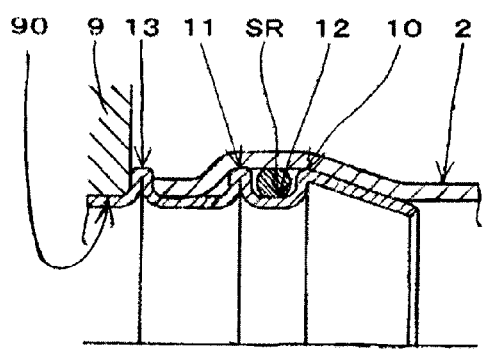
FIG. 3 is a semi-cross sectional view of a connection structure of a resin tube and a metallic pipe, in a manner similar to Embodiment 1.

In this embodiment, as shown in FIG. 3, the metallic pipe 1 is inserted by pressure and fitted in a hole 90 provided in a stationary wall 9. Then, the resin tube 2 is inserted by pressure over the portion of the metallic pipe 1 projecting from the stationary wall 9.

The metallic pipe 1, as shown in FIG. 3, has radially enlarged portions 10, 11, and a radially enlarged portion 13 which is formed in the same shape with the radially enlarged portion 11 and placed inner side of the enlarged portion 11 with a certain space. The metallic pipe 1 is inserted by pressure or fitted loosely into the hole 90 until the inner side surface of the enlarged portion 13 comes into direct contact with the outer surface of the stationary wall 9.

The resin tube 2 is similar in the construction to that described above. The resin tube 2 is inserted by pressure over the metallic pipe 1 until the tip of the resin tube 2 comes into direct contact with the outer side surface of the enlarged portion 13.

The connection structure allows the resin tube 2 and the metallic pipe 1 to remain sealed in the fluid tightness state with the seal ring SR accommodated therebetween, even if the resin tube 2 is declined in the tightening strength due to its thermal deterioration across the ages, hence inhibiting leakage of fluid throughout a longer period of time. In addition, the enlarged portion 13 acts as a stopper for the inserted end of the resin tube 2, hence the resin tube can be inserted with a simple pipe holding assembly.

Embodiment 2

Figure 4:
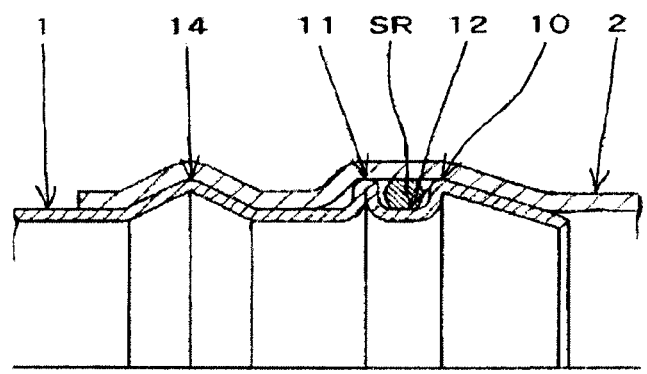
FIG. 4 is a semi-cross sectional view of a connection structure of a resin tube and a metallic pipe according to Embodiment 2 of the present invention.

FIG. 4 is a semi-cross sectional view of a connection structure of a resin tube 2 and a metallic pipe 1 according to Embodiment 2 of the present invention.

The metallic pipe 1 in this Embodiment 2 has enlarged portions 10, 11 according to Embodiment 1 and a enlarged portion 14 provided in an inverted V shape in the cross section (gradually enlarged and then gradually reduced in the diameter towards the inner side) for increasing physical strength preventing the resin tube 2 from coming off the metallic pipe 1, as shown in FIG. 4.

In this connection structure, as shown in FIG. 4, the resin tube 2 is inserted over and fitted by pressure onto the metallic pipe 1 until the inserted end completely passes beyond the enlarged portion 14.

Modification Similar to Embodiment 2

Figure 5:
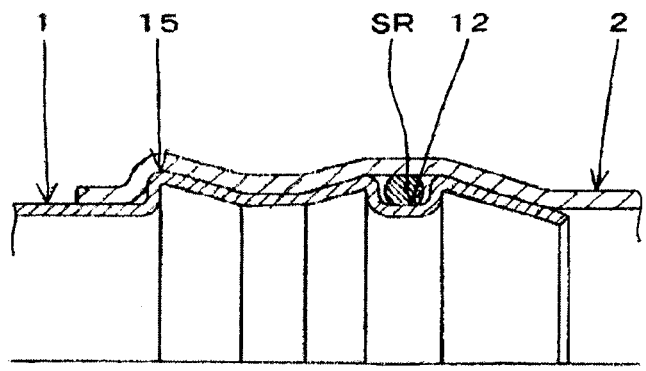
FIG. 5 is a semi-cross sectional view of a connection structure of a resin tube and a metallic pipe, in a manner similar Embodiment 2.

As shown in FIG. 5, instead of the enlarged portion 14 of the metallic pipe 1 formed in the inverted V shape in the cross-section, the metallic pipe 1 has a radially enlarged portion 15 which is gradually enlarged and then sharply reduced in the diameter towards the inner side. Also in this case, the physical strength for preventing the resin tube 2 from coming off the metallic pipe 1 is increased.

Alternatively, a radially enlarged portion may be formed on the inner side of the enlarged portion 14 and 15 for acting as a stopper for the inserted end of the resin tube 2.

The invention claimed is:

1. A resin-tube connection structure comprising:
   a metallic pipe having a tip edge and at least a first and a second radially enlarged portion at a tip area, the first and second radially enlarged portion having a substantially equal outer diameter and being spaced from each other to form a circumferential groove with a bottom therebetween;
   the first radially enlarged portion having a first circumferential edge, being at a most tip side, gradually and linearly increasing in diameter from the tip edge backwards to the first circumferential edge and therefrom sharply reducing in diameter to the bottom of the groove;
   the second radially enlarged portion having a second circumferential edge, being at a back side of the first radially enlarged portion, sharply increasing in diameter from the bottom of the groove to the second circumferential edge and therefrom reducing in diameter backwardly;
   a seal ring being accommodated in the circumferential groove; and
   a resin tube being inserted by pressure over the metallic pipe until it passes beyond the second radially enlarged portion.

2. The resin-tube connection structure according to claim 1, wherein a back ring is accommodated together with the seal ring in the circumferential groove.

3. The resin-tube connection structure according to claim 2, wherein the radially enlarged portions are formed by any one of a bulge-forming method and a spool-forming method.

4. The resin-tube connection structure according to claim 2, wherein the metallic pipe has a third radially enlarged portion at a back side of the second radially enlarged portion, for acting as a stopper for a tip of the resin tube inserted by pressure.

5. The resin-tube connection structure according to claim 2, wherein the metallic pipe has an additional radially enlarged portion at a back side of the second radially enlarged portion, for increasing physical strength preventing the resin tube from coming off the metallic pipe.

6. The resin-tube connection structure according to claim 1, wherein the radially enlarged portions of the metallic pipe are formed by any one of a bulge-forming method and a spool-forming method.

7. The resin-tube connection structure according to claim 6, wherein the metallic pipe has a third radially enlarged portion at a back side of the second radially enlarged portion, for acting as a stopper for a tip of the resin tube inserted by pressure.

8. The resin-tube connection structure according to claim 6, wherein the metallic pipe has an additional radially enlarged portion at a back side of the second radially enlarged portion, for increasing physical strength preventing the resin tube from coming off the metallic pipe.

9. The resin-tube connection structure according to claim 1, wherein the metallic pipe has a third radially enlarged portion at a back side of the second radially enlarged portion, for acting as a stopper for a tip of the resin tube inserted by pressure.

10. The resin-tube connection structure according to claim 1, wherein the metallic pipe has an additional radially enlarged portion at a back side of the second radially enlarged portion, for increasing physical strength preventing the resin tube from coming off the metallic pipe.

11. The resin-tube connection structure according to claim 1, wherein the second radially enlarged portion sharply reduces in diameter from the second circumferential edge backwardly.

* * * * *